US009064630B2

(12) United States Patent
Jang et al.

(10) Patent No.: US 9,064,630 B2
(45) Date of Patent: Jun. 23, 2015

(54) INTEGRATED HIGH FREQUENCY ROTARY TRANSFORMER AND RESOLVER FOR TRACTION MOTOR

(75) Inventors: Seok-Joo Jang, Irvine, CA (US); Peter J. Savagian, Bloomfield Hills, MI (US); Constantin C. Stancu, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 594 days.

(21) Appl. No.: 13/275,154

(22) Filed: Oct. 17, 2011

(65) Prior Publication Data

US 2013/0093294 A1    Apr. 18, 2013

(51) Int. Cl.
| G01B 7/30 | (2006.01) |
| H02K 11/00 | (2006.01) |
| H01F 27/40 | (2006.01) |
| H01F 38/18 | (2006.01) |
| H02K 29/08 | (2006.01) |

(52) U.S. Cl.
CPC .............. *H01F 27/402* (2013.01); *H02K 29/08* (2013.01); *H02K 11/0021* (2013.01); *H01F 38/18* (2013.01)

(58) Field of Classification Search
CPC ....... H01F 38/18; H01F 27/402; H02K 29/08; H02K 11/0021
USPC ........................................ 310/68 B; 318/661
See application file for complete search history.

(56) References Cited

U.S. PATENT DOCUMENTS

| 4,155,018 | A |   | 5/1979  | Oudet |
| 4,255,682 | A | * | 3/1981  | Toida et al. ................... 310/168 |
| 4,406,983 | A | * | 9/1983  | Ramirez ....................... 318/653 |
| 4,772,815 | A |   | 9/1988  | Harned et al. |
| 4,779,031 | A | * | 10/1988 | Arends et al. ................. 318/565 |
| 4,779,454 | A | * | 10/1988 | Fitzner et al. ............... 73/114.26 |
| 4,899,145 | A | * | 2/1990  | Okuda et al. ................... 341/15 |
| 4,962,331 | A | * | 10/1990 | Smith ..................... 310/216.001 |
| 5,202,612 | A | * | 4/1993  | Yoshida et al. ........... 318/400.01 |
| 5,300,884 | A | * | 4/1994  | Maestre .................. 324/207.25 |

(Continued)

FOREIGN PATENT DOCUMENTS

| CN | 101029818 A | 9/2007 |
| CN | 102428350 A | 4/2012 |

(Continued)

OTHER PUBLICATIONS

U.S. Appl. No. 13/036,652, filed Feb. 28, 2011.

(Continued)

*Primary Examiner* — Alex W Mok
(74) *Attorney, Agent, or Firm* — Ingrassia Fisher & Lorenz, P.C.

(57) ABSTRACT

An integrated rotary transformer and resolver and a motor including an integrated rotary transformer and resolver is provided. The integrated rotary transformer and resolver may include, but is not limited to, a stator having an outer surface and a plurality of slots disposed along the outer surface, a plurality of sensing coils, the plurality of sensing coils disposed in at least some of the plurality of slots, a rotor having a surface varying from a first predetermined thickness to a second predetermined thickness, and a controller electrically coupled to the plurality of sensing coils and configured to determine a position of the rotor based upon a voltage induced in each of the coils due to a relative thickness of the rotor opposed to the respective sensing coil.

20 Claims, 4 Drawing Sheets

(56) References Cited

U.S. PATENT DOCUMENTS

| | | | | |
|---|---|---|---|---|
| 5,541,488 | A * | 7/1996 | Bansal et al. | 318/801 |
| 5,912,521 | A * | 6/1999 | Ray | 310/156.06 |
| 5,969,454 | A * | 10/1999 | Pengov et al. | 310/162 |
| 6,930,423 | B2 * | 8/2005 | Kitazawa | 310/168 |
| 7,075,196 | B1 * | 7/2006 | Labriola, II | 310/12.19 |
| 7,197,113 | B1 * | 3/2007 | Katcha et al. | 378/101 |
| 7,235,966 | B2 * | 6/2007 | Miya | 324/207.25 |
| 7,467,456 | B2 * | 12/2008 | Chang et al. | 29/598 |
| 7,508,154 | B1 * | 3/2009 | Labriola, II | 318/602 |
| 7,538,460 | B2 * | 5/2009 | Labriola, II | 310/68 B |
| 7,723,942 | B1 * | 5/2010 | Labriola, II | 318/601 |
| 7,868,723 | B2 * | 1/2011 | Dobbs | 336/84 C |
| 8,193,748 | B2 * | 6/2012 | Deller et al. | 318/400.04 |
| 2002/0047451 | A1 * | 4/2002 | Weimer | 310/184 |
| 2003/0057791 | A1 * | 3/2003 | Post | 310/191 |
| 2003/0090223 | A1 * | 5/2003 | Nishizawa et al. | 318/268 |
| 2004/0119466 | A1 * | 6/2004 | Akatsu et al. | 324/207.15 |
| 2004/0174162 | A1 | 9/2004 | Kuwahara | |
| 2004/0188876 | A1 * | 9/2004 | Baumann et al. | 264/40.1 |
| 2006/0022785 | A1 * | 2/2006 | Dobbs | 336/120 |
| 2006/0197393 | A1 * | 9/2006 | Labriola | 310/68 B |
| 2006/0232147 | A1 * | 10/2006 | Cheng | 310/52 |
| 2007/0152515 | A1 * | 7/2007 | Motherway et al. | 310/12 |
| 2009/0179632 | A1 * | 7/2009 | Nishiguchi et al. | 324/207.25 |
| 2010/0090633 | A1 * | 4/2010 | Deller et al. | 318/400.39 |
| 2010/0109491 | A1 * | 5/2010 | Miyazaki et al. | 310/68 B |
| 2011/0169382 | A1 * | 7/2011 | Coleman et al. | 310/68 B |

FOREIGN PATENT DOCUMENTS

| | | |
|---|---|---|
| DE | 2738789 A1 | 7/1978 |
| DE | 3831248 A1 | 3/1989 |
| DE | 10251154 A1 | 5/2004 |

OTHER PUBLICATIONS

German Patent and Trade Mark Office, Office Action for German Patent Application No. 10 2012 216 526.6, mailed Jan. 7, 2014.
Chinese Patent and Trade Mark Office, Office Action for Chinese Patent Application No. 201210394443.4. mailed Dec. 18, 2014.

* cited by examiner

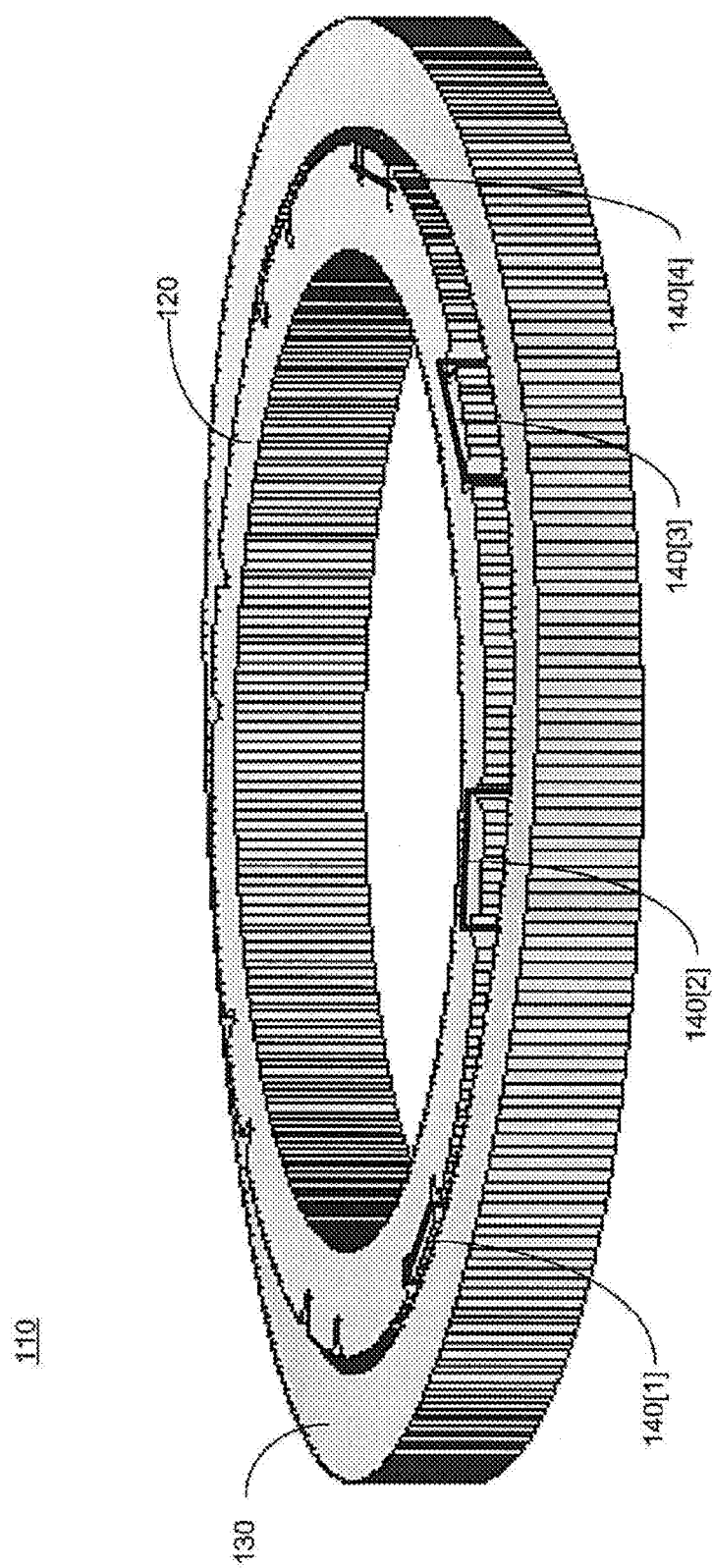

INTEGRATED HIGH FREQUENCY ROTARY TRANSFORMER AND RESOLVER FOR TRACTION MOTOR

TECHNICAL FIELD

Embodiments of the subject matter described herein relate generally to traction motors and more particularly to an integrated high frequency rotary transformer and resolver for a traction motor.

BACKGROUND

Plug-in Hybrid and fully electric vehicles have become increasingly popular in recent years. These vehicles typically utilize traction motors. Some traction motors have a wound rotor and use a rotary transformer to pass electrical power from a stationary side (i.e., a stator) to a rotating side (i.e., a rotor). Current traction motor configurations also utilize a separate resolver to determine an angular position of the motors rotor.

Accordingly, it is desirable to reduce the size and cost of the traction motor. Other desirable features and characteristics will become apparent from the subsequent detailed description and the appended claims, taken in conjunction with the accompanying drawings and this background.

BRIEF SUMMARY

In accordance with one embodiment, an integrated rotary transformer and resolver is provided. The integrated rotary transformer and resolver may include, but is not limited to, a stator having an outer surface and a plurality of slots disposed along the outer surface, a plurality of sensing coils, the plurality of sensing coils disposed in at least some of the plurality of slots, a rotor having a surface varying from a first predetermined thickness to a second predetermined thickness, and a controller electrically coupled to the plurality of sensing coils and configured to determine a position of the rotor based upon a voltage induced in each of the coils due to a relative thickness of the rotor opposed to the respective sensing coil.

In accordance with another embodiment, a motor is provided. The motor may include, but is not limited to, an interface configured to receive an alternating current, a stator coupled to the interface the stator having a primary winding and having an outer surface and a plurality of slots disposed along the outer surface, a plurality of sensing coils, the plurality of sensing coils disposed in at least some of the plurality of slots, a rotor having a secondary winding positioned opposite the first winding of the stator and having a surface varying from a first predetermined thickness to a second predetermined thickness, and a controller electrically coupled to the plurality of sensing coils and configured to determine a position of the rotor based upon a voltage induced in each of the coils due to a relative thickness of the rotor opposed to the respective sensing coil.

In yet another embodiment, an apparatus is provided. The apparatus includes, but is not limited to, a rotor having an sinusoidal upper surface and having a notch in an inner surface, a first winding wound in the notch in the rotor, a stator having a notch on an outer surface, the outer surface of the stator positioned opposite the inner surface of the rotor, the outer surface further including a plurality of slots, a secondary winding wound in the notch in the stator, a plurality of sensing coils wound in at least some of the plurality of slots, and a controller electrically coupled to the plurality of sensing coils and configured to determine a position of the rotor based upon an output of the plurality of sensing coils.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 illustrates an exemplary integrated rotary transformer and resolver in accordance with an embodiment.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
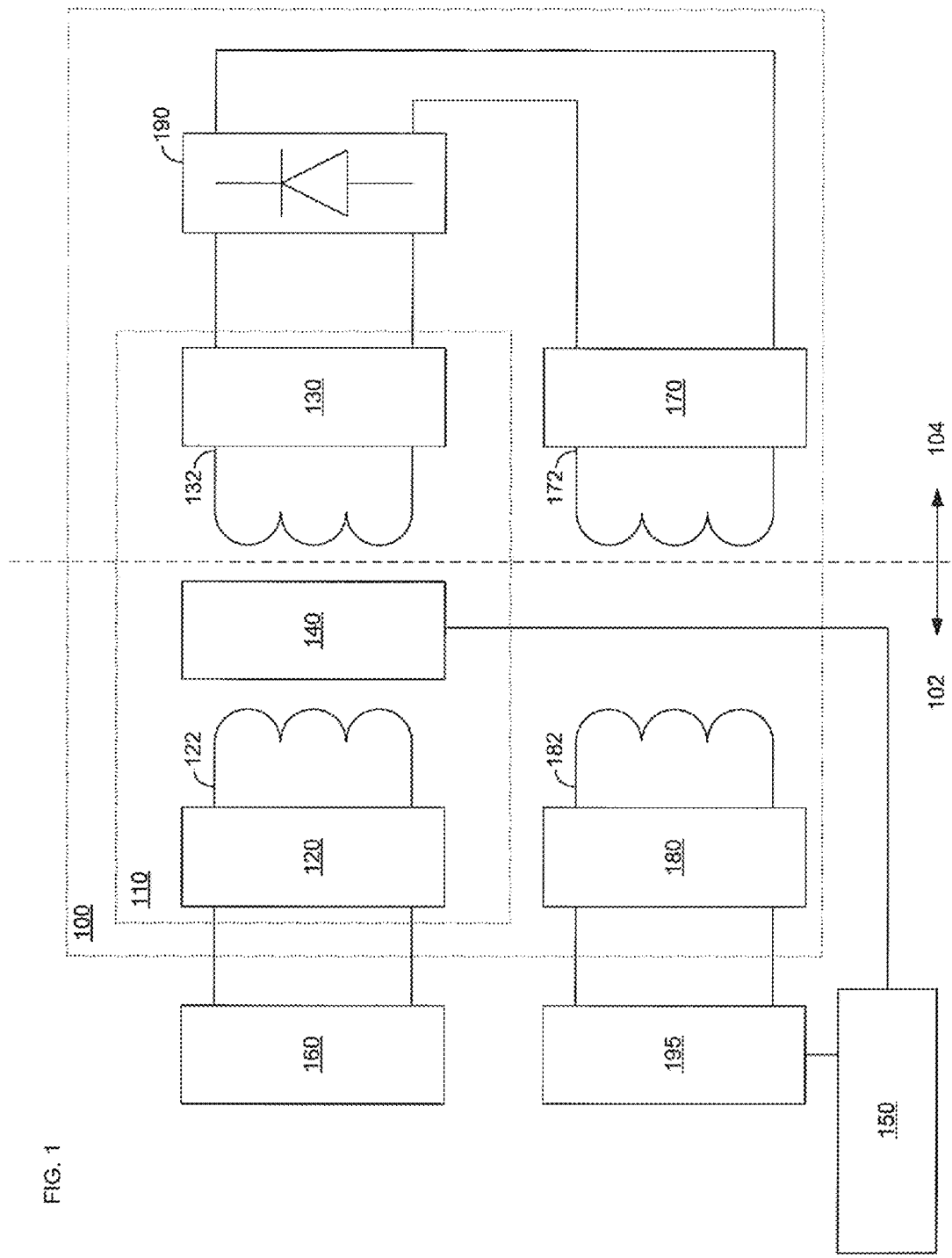
FIG. 1 is a block diagram of an exemplary traction motor having an integrated rotary transformer and resolver, in accordance with an embodiment.

FIG. 1 is a block diagram of an exemplary traction motor 100 having an integrated rotary transformer and resolver 110. The motor 100 has a stationary side 102 and a rotating side 104. The motor 100 includes a motor stator 170 having a motor stator winding 172. The motor stator 180 is electrically connected to a multi-phase inverter 195. The motor 100 also includes motor rotor 180 having a field winding 182. The traction motor 100 may otherwise be known as a wound rotor synchronous machine. The integrated rotary transformer and resolver 110 provides brushless power to the field winding 182 and provides rotor position information necessary for the control of the motor 100. The rotor 130 of the integrated rotary transformer and resolver 110 rotates with the motor rotor 180. Accordingly, the rotor 130 and the rotor 180 have the same angular position.

Because the traction motor 100 includes an integrated rotary transformer and resolver 110, the size and cost of the traction motor 100 can be reduced relative to traction motors that have separate rotary transformers and resolvers. The integrated rotary transformer and resolver 110 includes a stator 120 having a primary winding 122 and a rotor 130 having a secondary winding 132.

The stator 120 of the integrated rotary transformer and resolver 110 is electrically coupled to a high frequency alternating current (AC) energy source 160. The integrated rotary transformer and resolver 110 delivers electrical energy to the rotor 170 of the motor 100 using the magnetic coupling of the primary winding 122 to the secondary winding 132. The voltage induced in the secondary winding 132 is converted to DC (rectification) by a rectification circuit 190 and is used to supply the field winding of the motor 100.

In order to provide mechanical position information of the rotor 170 of the traction motor 100, the integrated rotary transformer and resolver 110 includes a series of additional sensing coils 140. In one embodiment, for example, the sensing coils 140 are coupled to an outer surface of the stator 120 and are adjacent to the rotor 130, as discussed in further detail below. Each of the sensing coils 140 are electrically coupled to a controller 150 and output a voltage. The controller 150 is configured to receive the voltage from the sensing coils 140 and determine a position of the rotor 130 based upon the received voltages, as discussed in further detail below.

In one embodiment, for example, the controller 150 is a processor. The controller 150 may be any type of processor. For example, the controller 150 may be a central processing unit, a graphical processing unit, a digital signal processor, an application specific integrated circuit (for example, a resolver-to-digital converter), a field programmable gate array, a microcontroller, or any other type of processor or combination of processors.

Figure 2:
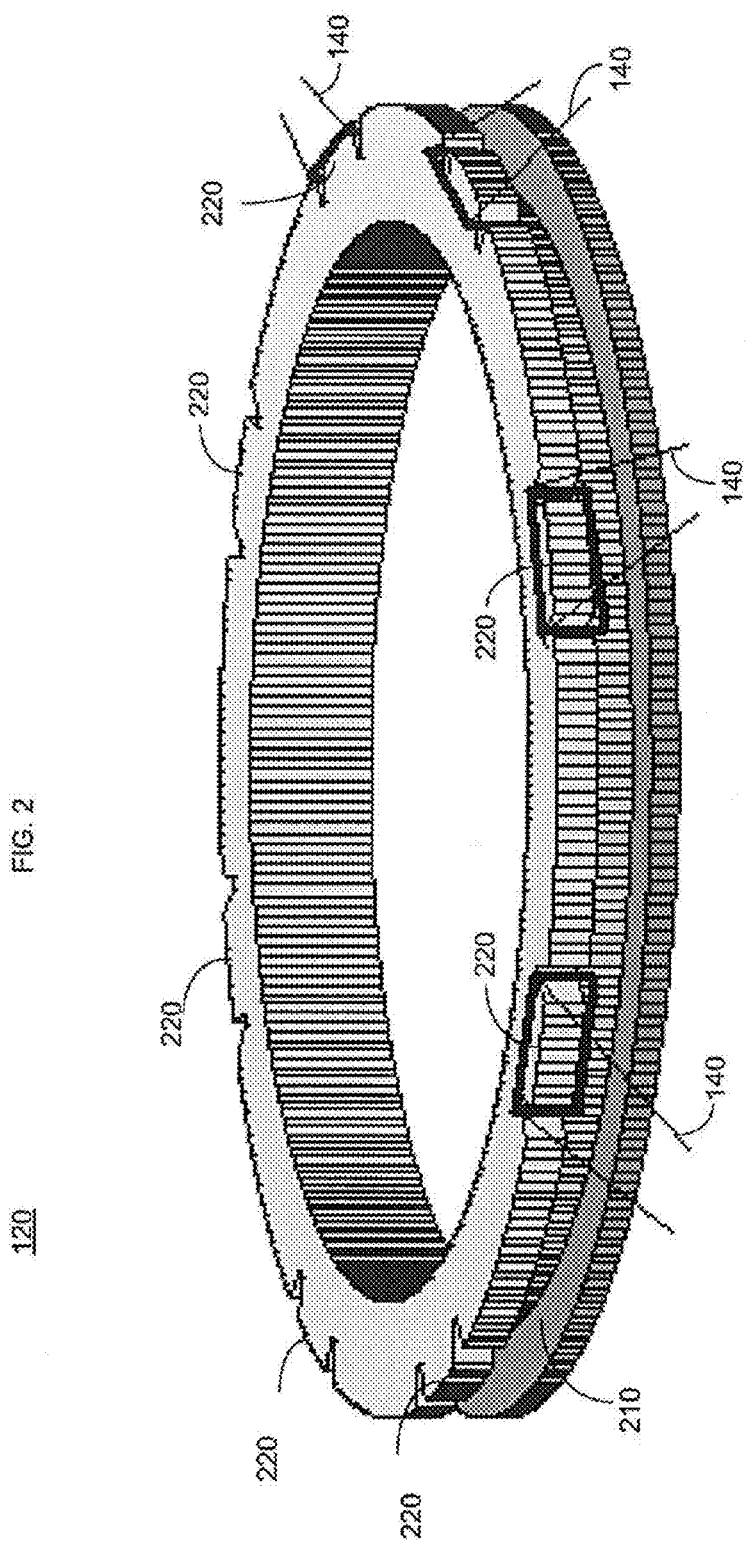
FIG. 2 is an exemplary stator which could be used in the traction motor illustrated in FIG. 1 in accordance with an exemplary embodiment.

FIG. 2 is an exemplary stator 120 which could be used in the traction motor 100 illustrated in FIG. 1 in accordance with an exemplary embodiment. In one embodiment, for example, the stator 120 is substantially cylindrical. The stator 120 also includes a notch 210 along a perimeter of the stator 120 where the primary windings (not illustrated) may be wound.

The stator 120 also includes multiple slots 220. The slots 220 are disposed substantially periodically around an upper perimeter of the stator 120, ninety degrees apart on a pole pair basis, four slots per resolver pole pair. In the embodiment illustrated in FIG. 2, there are eight slots 220. The number of slots 220 in the stator 120 will vary depending upon the number of poles intended for the resolver function of the integrated rotary transformer and resolver 110. For example, a six-pole resolver could include twelve slots. Each slot 220 is formed by two indentations in the upper surface of the stator 120. Sensing coils 140 may be wrapped around some or all of the slots 220, as discussed in further detail below.

In one embodiment, for example, each sensing coil 140 may be an insulated copper wire. Each sensing coil 140 is connected to the controller 150. The sensing coils 140, in conjunction with the controller 150, determine a position of a rotor, as discussed in further detail below. The number of sensing coils 140 will correspond to the number of poles of the resolver 130. For example, the stator 120 illustrated in FIG. 2 may be used in a four-pole resolver functionality or application and could have either four or eight sensing coils 140. Likewise, a six-pole resolver could use six or twelve sensing coils 140. The sensing coils 140 are wound around adjacent slots 220. As discussed in further detail below, by placing the sensing coils 140 in four adjacent slots, the position of a rotor 130 can accurately be determined every resolver pole pair of rotation. When the sensing coils 140 are wound in each slot 220, four types of coils will emerge following this approach: (sin), (cos), (-sin), (-cos), depending on their position on the stator. All the coils of the same type will be connected for example in series, so that four voltages will sent to the controller 150, no matter how many poles the resolver has.

Figure 3:
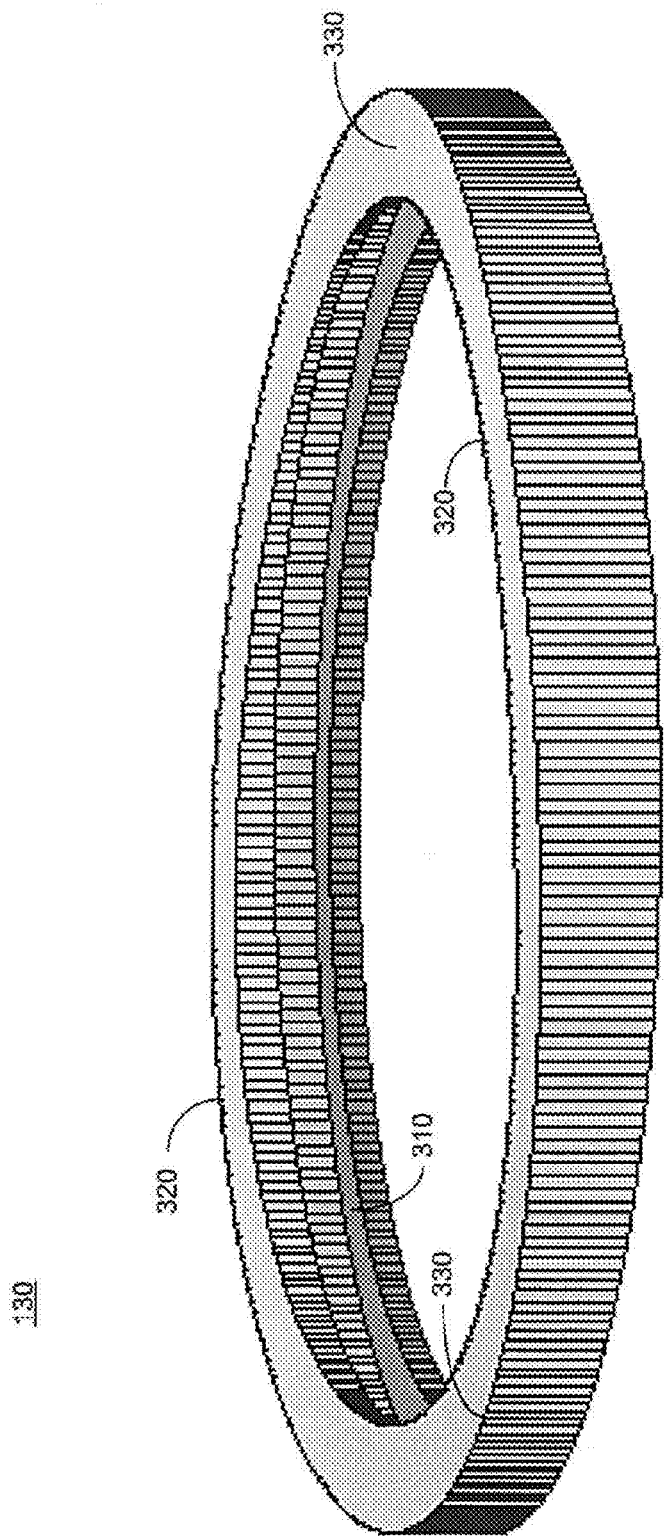
FIG. 3 is an exemplary rotor which could be used in the traction motor illustrated in FIG. 1 in accordance with an exemplary embodiment.

FIG. 3 is an exemplary rotor 130 which could be used in the traction motor 100 illustrated in FIG. 1 in accordance with an exemplary embodiment. The rotor 130 includes a notch 310 along an inner surface. The secondary winding of the rotor can be wound in the notch 310.

As illustrated in FIG. 3, the rotor 130 has a sinusoidal upper surface having a varied thickness or height. In one embodiment, for example, an upper surface of the rotor 130 may vary according to two cycles of a sine wave for a four-pole resolver. In other embodiments, the upper surface of the rotor may have a different undulating patterns may be used. The height of each peak 320 and valley 330 may be selected such that a sensing coil 140 on a stator 120 outputs a predetermined voltage, as discussed in further detail below. The total number of peaks 320 and valleys 330 of the rotor 130 correspond to the number of poles intended for the resolver function. For example, the rotor 130 illustrated in FIG. 3 is for a four-pole resolver and includes two peaks and two valleys. Accordingly, a peak 320 and valley 330 of the rotor 130 will pass by each sensing coil 140 twice per a single rotation of the rotor, as illustrated in further detail below.

While the above description refers to a stator 120 having a number of slots 220 and a rotor 130 having an undulating upper surface, the physical characteristics of the stator and rotor for the integrated rotary transformer and resolver 110 may be reversed. In other words, the stator 120 can be configured to have an undulating upper and the rotor 130 can be configured to have the slots 220. In another embodiment, for example, the role of the two cores could be reversed. In other words, the core in FIG. 2 could be the rotor and the core in FIG. 3 could be the stator.

FIG. 4 illustrates an exemplary integrated rotary transformer and resolver 110 in accordance with an embodiment. As seen in FIG. 4, the stator 120 has a diameter which is smaller than the diameter of the rotor 130. Accordingly, when the stator receives a the high frequency AC signal from the AC energy source 160 a magnetic flux is created across the stator 120 and rotor 130. Because the upper surface of the rotor is sinusoidal, the magnetic flux is not distributed evenly. The magnetic flux, which varies based upon the thickness of the rotor, causes each sensing coils 140 to output a voltage proportional to the magnetic flux. In other words, the voltage sensed by each respective sensing set of coils 140[1]-140[4] is proportional to the surface area of the rotor 130 in front (i.e., opposing) the respective sensing coil 140. The position of the rotor 130 can be determined by the controller 150 based upon the voltage induced in each of the coils, as discussed in further below.

When the integrated rotary transformer and resolver 110 is used in a four-pole traction resolver, the voltages of the four sensing coils 140[1]-140[4] would follow the following equations:

$$V1 = K1 * Vac * (\sin(P*\Theta r) + K2)$$

$$V2 = K1 * Vac * (-\sin(P*\Theta r) + K2)$$

$$V3 = K1 * Vac * (\cos(P*\Theta r) + K2)$$

$$V4 = K1 * Vac * (-\cos(P*\Theta r) + K2)$$

where:
K1 and K2 are constant values defined by the magnetic coupling structure;
Vac is the voltage of the high frequency AC source applied to the primary winding;
$\Theta r$ is the mechanical angle of the rotor; and
P is number of pole pairs of the resolver.

By processing these four voltages, the controller 150 can determine an electrical angle $\Theta e$ of the rotor, where the electrical angle $\Theta e$ is equal to P times the value of the mechanical angle Θr. In this embodiment, the controller determines the electrical angle Θe according to the following equation:

$$\Theta e = a\tan 2([V1-V2],[V3-V4])$$

A tan 2 is a two-argument function and is a variation of the arctangent function. For any real arguments x and y not both equal to zero, a tan 2(y, x) is the angle in radians between the positive x-axis of a plane and the point given by the coordinates (x, y) on it. The angle is positive for counter-clockwise angles (upper half-plane, y>0), and negative for clockwise angles (lower half-plane, y<0).

As discussed above, the voltage output by each sensing coil 140 is proportional to the surface area of the rotor 130 in front (i.e., opposing) the respective sensing coil 140. By adjusting the thickness of the rotor, the values of K1 and K2 can be changed. Accordingly, the rotor can be constructed such that any desired voltage can be sensed by the sensing coils.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An integrated rotary transformer and resolver, comprising:
    a stator having an outer surface, the outer surface having a first notch along a perimeter of the outer surface and a plurality of slots disposed along the outer surface;
    a rotary transformer primary winding wrapped around the perimeter of the outer surface of the stator within the first notch;
    a plurality of sensing coils, the plurality of sensing coils disposed in at least some of the plurality of slots;
    a rotor having an inner surface, the inner surface having a second notch along a perimeter of the inner surface, and an upper surface varying sinusoidally from a first predetermined thickness to a second predetermined thickness;
    a rotary transformer secondary winding wrapped around the perimeter of the inner surface of the rotor within the second notch, wherein the rotary transformer primary winding of the stator is configured to transfer power to the rotary transformer secondary winding of the rotor; and
    a controller electrically coupled to the plurality of sensing coils and configured to determine a position of the rotor based upon a voltage induced in each of the sensing coils due to a thickness of the rotor opposed to the respective sensing coil.

2. The integrated rotary transformer and resolver of claim 1, wherein the stator includes eight slots.

3. The integrated rotary transformer and resolver of claim 2, wherein the plurality of sensing coils comprises four sensing coils and the four sensing coils are positioned in four adjacent slots of the eight slots.

4. The integrated rotary transformer and resolver of claim 2, wherein the surface of the rotor includes two peaks having the first predetermined thickness and two valleys having the second predetermined thickness.

5. The integrated rotary transformer and resolver of claim 1, wherein the stator includes twelve slots.

6. The integrated rotary transformer and resolver of claim 5, wherein the plurality of sensing coils comprises six sensing coils and the six sensing coils are positioned in six adjacent slots.

7. The integrated rotary transformer and resolver of claim 5, wherein the surface of the rotor includes three peaks having the first predetermined thickness and three valleys having the second predetermined thickness.

8. A motor, comprising:
    an interface configured to receive an alternating current;
    a stator coupled to the interface, the stator having an outer surface and comprising a first notch around a perimeter of the outer surface, a rotary transformer primary winding wound around the outer surface of the stator within the first notch, and a plurality of slots disposed along the outer surface;
    a plurality of sensing coils, the plurality of sensing coils disposed in at least some of the plurality of slots;
    a rotor having an inner surface, the inner surface having a second notch along a perimeter of the inner surface and a rotary transformer secondary winding positioned opposite the rotary transformer primary winding and wrapped around the inner surface of the rotor within the second notch of the rotor and having an upper surface varying sinusoidally from a first predetermined thickness to a second predetermined thickness; and
    a controller electrically coupled to the plurality of sensing coils and configured to determine a position of the rotor based upon a voltage induced in each of the sensing coils due to a thickness of the rotor opposed to the respective sensing coil.

9. The motor of claim 8, wherein the stator includes eight slots.

10. The motor of claim 9, wherein the plurality of sensing coils comprises four sensing coils and the four sensing coils are positioned in four adjacent slots of the eight slots.

11. The motor of claim 8, wherein the surface of the rotor includes two peaks having the first predetermined thickness and two valleys having the second predetermined thickness.

12. The motor of claim 8, wherein the stator includes twelve slots.

13. The motor of claim 12, wherein the plurality of sensing coils comprises six sensing coils and the six sensing coils are positioned in six adjacent slots of the twelve slots.

14. The motor of claim 8, wherein the surface of the rotor includes three peaks having the first predetermined thickness and three valleys having the second predetermined thickness.

15. An apparatus, comprising:
    a rotor having an sinusoidal upper surface and having a notch in an inner surface;
    a first winding wound in the notch in the rotor;
    a stator having a notch on an outer surface, the outer surface of the stator positioned opposite the inner surface of the rotor, the outer surface further including a plurality of slots;
    a secondary winding wound in the notch in the stator;
    a plurality of sensing coils wound in at least some of the plurality of slots; and
    a controller electrically coupled to the plurality of sensing coils and configured to determine a position of the rotor based upon a voltage induced in each of the sensing coils due to a thickness of the sinusoidal upper surface of the rotor opposed to the respective sensing coil.

16. The apparatus of claim 15, wherein the plurality of slots are periodically spaced along the outer surface of the stator.

17. The apparatus of claim 15, wherein there are four sensing coils and the four sensing coils are wound in four adjacent slots along the outer surface of the stator.

18. The apparatus of claim 17, wherein a first of the four sensing coils outputs a first voltage (V1) based upon a thickness of the sinusoidal upper surface of the rotor opposed to the first of the four sensing coils, a second of the four sensing coils outputs a second voltage (V2) based upon a thickness of the sinusoidal upper surface of the rotor opposed to the second of the four sensing coils, a third of the four sensing coils outputs a third voltage (V3) based upon a thickness of the sinusoidal upper surface of the rotor opposed to the third of the four sensing coils, and a fourth of the four sensing coils outputs a fourth voltage (V4) based upon a thickness of the sinusoidal upper surface of the rotor opposed to the fourth of the four sensing coils.

19. The apparatus of claim 18, wherein the controller is further configured to determine a mechanical angle of the rotor based upon an angle determined by a tan 2(V1−V2, V3−V4).

20. The apparatus of claim 19, wherein the controller is further configured to determine an electrical angle of the rotor based upon the mechanical angle of the rotor.

\* \* \* \* \*